(12) United States Patent
Khalifa et al.

(10) Patent No.: US 10,789,344 B2
(45) Date of Patent: Sep. 29, 2020

(54) BIOMETRIC HANDHELD VAPORIZER AND METHOD OF PREVENTING UNDERAGE USE

(71) Applicants: Mohammed M. Khalifa, Walnut, CA (US); Ali Mostafa Ali Elsaid, Walnut, CA (US)

(72) Inventors: Mohammed M. Khalifa, Walnut, CA (US); Ali Mostafa Ali Elsaid, Walnut, CA (US)

( * ) Notice: Subject to any disclaimer, the term of this patent is extended or adjusted under 35 U.S.C. 154(b) by 0 days.

(21) Appl. No.: 16/231,388

(22) Filed: Dec. 21, 2018

(65) Prior Publication Data

US 2019/0197225 A1 Jun. 27, 2019

Related U.S. Application Data

(60) Provisional application No. 62/610,047, filed on Dec. 22, 2017.

(51) Int. Cl.

| | |
|---|---|
| *G06F 21/32* | (2013.01) |
| *A24F 47/00* | (2020.01) |
| *G06F 21/44* | (2013.01) |
| *G06F 21/30* | (2013.01) |
| *G06F 21/33* | (2013.01) |
| *G06K 9/00* | (2006.01) |

(52) U.S. Cl.
CPC ............ *G06F 21/32* (2013.01); *A24F 47/008* (2013.01); *G06F 21/305* (2013.01); *G06F 21/335* (2013.01); *G06F 21/44* (2013.01); *G06K 9/00087* (2013.01)

(58) Field of Classification Search
CPC ...... G06F 21/32; G06F 21/305; G06F 21/335; G06F 21/44; A24F 47/008; G06K 9/00087
See application file for complete search history.

(56) References Cited

U.S. PATENT DOCUMENTS

| | | | | |
|---|---|---|---|---|
| 9,247,773 | B2 * | 2/2016 | Memari | ................. A24F 15/18 |
| 9,675,114 | B2 * | 6/2017 | Timmermans | ........ A24F 47/008 |
| 9,763,478 | B2 * | 9/2017 | Cameron | .................. F01K 5/00 |
| 9,936,737 | B2 * | 4/2018 | Cameron | .............. A24F 47/008 |
| 10,149,497 | B2 * | 12/2018 | Memari | ................. A24F 40/485 |
| 2002/0032664 | A1 * | 3/2002 | Ikuta | ..................... H04M 15/00 705/73 |
| 2003/0070100 | A1 * | 4/2003 | Winkler | .................. G07F 17/32 726/26 |
| 2003/0154376 | A1 * | 8/2003 | Hwangbo | ............. H04L 9/3226 713/173 |
| 2007/0260491 | A1 * | 11/2007 | Palmer | ................ G06F 19/3418 705/3 |

(Continued)

*Primary Examiner* — Rufus C Point
(74) *Attorney, Agent, or Firm* — Gurr Brande & Spendlove, PLLC; Robert A. Gurr

(57) ABSTRACT

A biometric handheld vaporizer has a housing, a mouthpiece, an oil reservoir, an atomizer, a battery, a battery charging port, a fingerprint sensor, and a microcontroller. The handheld vaporizer remains inoperable until a user submits a photo ID for age verification. One method of using a biometric handheld vaporizer involves inputting fingerprints into the vaporizer, the fingerprints stored on the microcontroller; and, when a user desires to use the vaporizer, placing the authorized fingerprint on the fingerprint sensor, which, upon authorization, closes a circuit to activate an atomizer within the vaporizer.

2 Claims, 9 Drawing Sheets

(56) References Cited

U.S. PATENT DOCUMENTS

| | | | |
|---|---|---|---|
| 2014/0123990 A1* | 5/2014 | Timmermans | A24F 47/008 |
| | | | 131/328 |
| 2014/0298511 A1* | 10/2014 | Lewis | A01H 5/10 |
| | | | 800/260 |
| 2016/0155127 A1* | 6/2016 | Hartman | G06Q 20/18 |
| | | | 705/18 |
| 2016/0331913 A1* | 11/2016 | Bourque | A61M 11/042 |
| 2017/0076523 A1* | 3/2017 | Rumble | G06Q 20/127 |
| 2017/0119058 A1* | 5/2017 | Cameron | H05B 1/0244 |
| 2018/0020724 A1* | 1/2018 | Alarcon | H04L 67/306 |
| | | | 717/168 |
| 2018/0043114 A1* | 2/2018 | Bowen | A61M 15/003 |
| 2018/0271155 A1* | 9/2018 | Baker | A24F 40/90 |
| 2019/0158938 A1* | 5/2019 | Bowen | A24F 47/008 |

* cited by examiner

BIOMETRIC HANDHELD VAPORIZER AND METHOD OF PREVENTING UNDERAGE USE

CROSS-REFERENCE TO RELATED APPLICATIONS

This application claims the benefit of U.S. Provisional Application Ser. No. 62/610,047, filed on Dec. 22, 2017, which is incorporated herein by reference.

TECHNICAL FIELD

The present disclosure relates to vaporizers. More particularly, the present disclosure relates to biometric authentication on handheld vaporizers (also known as e-cigarettes).

BACKGROUND

Use of traditional cigarettes has dropped dramatically in the last several years, due not only to health concerns, but also to alternative methods of using nicotine. Specifically, the advent and use of handheld vaporizers, or e-cigarettes, has had an impact on the traditional tobacco cigarette. However, unlike regular cigarettes that require a flame or heat source to activate, vaporizers may be used by simply pushing a button, or in some cases, by merely inhaling. Accordingly, there is a recognized need to keep children safe from these devices, especially since nicotine can have adverse reactions in young children. To address this concern, locking caps, switches, buttons, locking storage containers, and other methods have been introduced. However, these methods are inadequate for several reasons. First, they often require additional steps by a user to properly secure. In other words, if the user doesn't replace the cap, flip the switch, or lock-up the vaporizer, it remains accessible. Further, children often defeat the employed safety measure by merely watching their parent or another user disable the safety feature.

Additionally, there is a concern of not only use by minors, but also by unauthorized individuals (e.g., thieves). Again, the locking mechanisms currently in the art are easily defeated by thieves.

Accordingly, there is a need for a handheld vaporizer that doesn't require additional steps by a user to employ security, that prevents any underage or accidental use, that prevents unauthorized use, and that still remains easy-to-use for the intended user. The biometric handheld vaporizer disclosed herein solves these, and other, problems.

SUMMARY OF EXAMPLE EMBODIMENTS

In one embodiment, a biometric handheld vaporizer comprises a housing, a mouthpiece, an oil reservoir, an atomizer, a battery, a battery charging port, a fingerprint sensor, and a microcontroller.

In one embodiment, a biometric handheld vaporizer comprises a housing, a mouthpiece, an oil reservoir, a heating element, a battery, a battery charging port, a fingerprint sensor, and a microcontroller.

In one embodiment, a biometric handheld vaporizer comprises a housing, a mouthpiece, an oil reservoir, a heating element, a battery, a battery charging port, a fingerprint sensor, a microcontroller, and a wireless transceiver.

In one embodiment, a method of using a biometric handheld vaporizer comprises inputting the authorized fingerprints into the vaporizer, the fingerprints stored on the microcontroller; and, when a user desires to use the vaporizer, placing the authorized fingerprint on the fingerprint sensor, which, upon authorization, closes a circuit to activate an atomizer within the vaporizer.

In one embodiment a method of using a handheld vaporizer comprises sending a signal from a mobile phone, via Bluetooth® or similar wireless technology, to the vaporizer to authorize use of the device. Upon receiving an authorized signal, the atomizer is activated in the vaporizer.

In one method of activating a handheld vaporizer for use, a user uploads a government ID or other credentials to prove they are of legal age. Once the ID has been reviewed, the handheld device will be activated.

DETAILED DESCRIPTION OF EXAMPLE EMBODIMENTS

Figure 1:
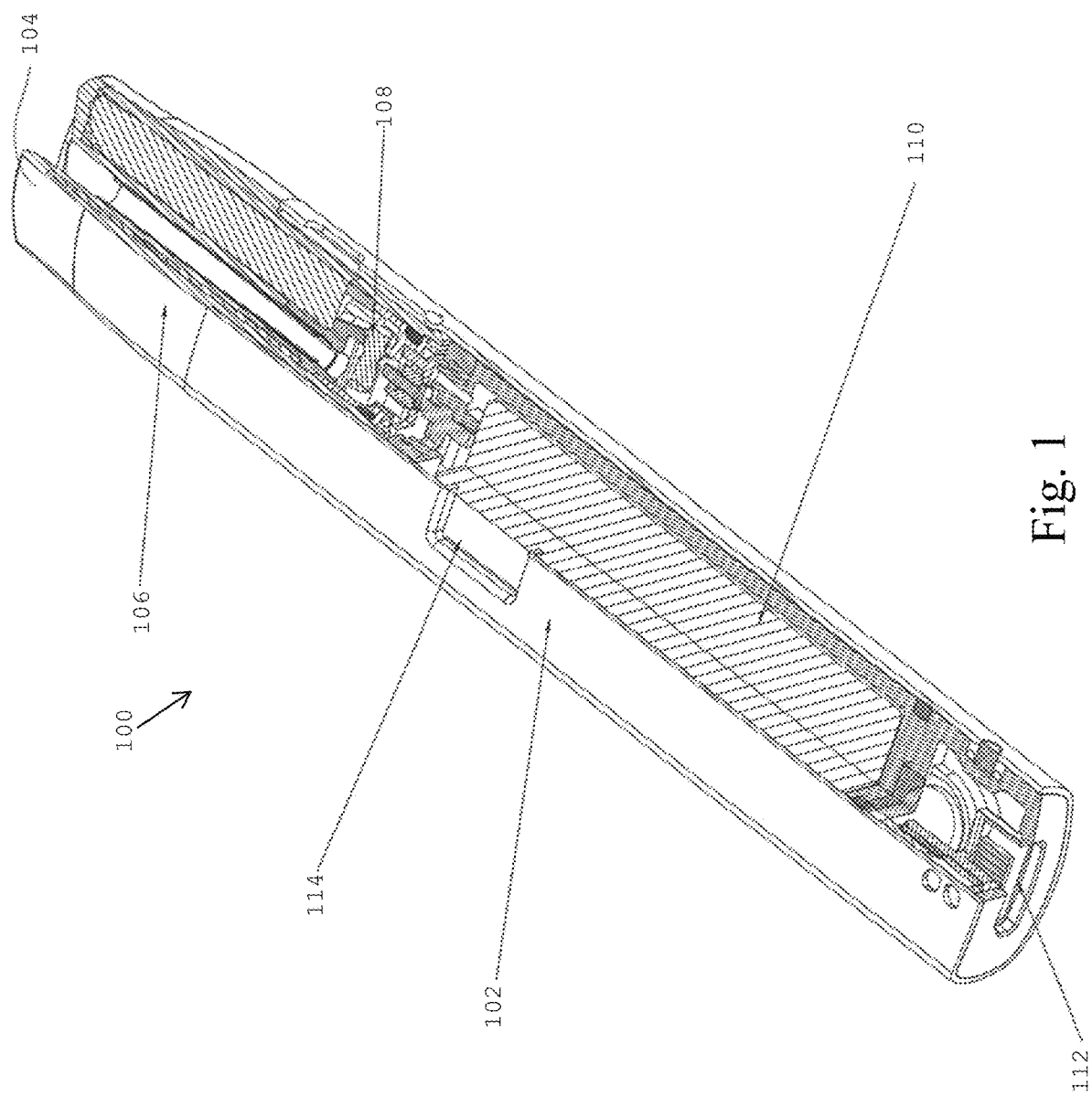
FIG. 1 illustrates a cut-away, partial cross-section of a biometric handheld vaporizer.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a handheld vaporizer that doesn't require additional steps by a user to employ security, that prevents any underage or accidental use, and that still remains easy-to-use for the intended user. The biometric handheld vaporizer disclosed herein solves these, and other, problems. It will be appreciated that while described as a "biometric handheld vaporizer," the biometrics reader is not required to be on the vaporizer itself, as will be understood from the below disclosure.

Figure 2:
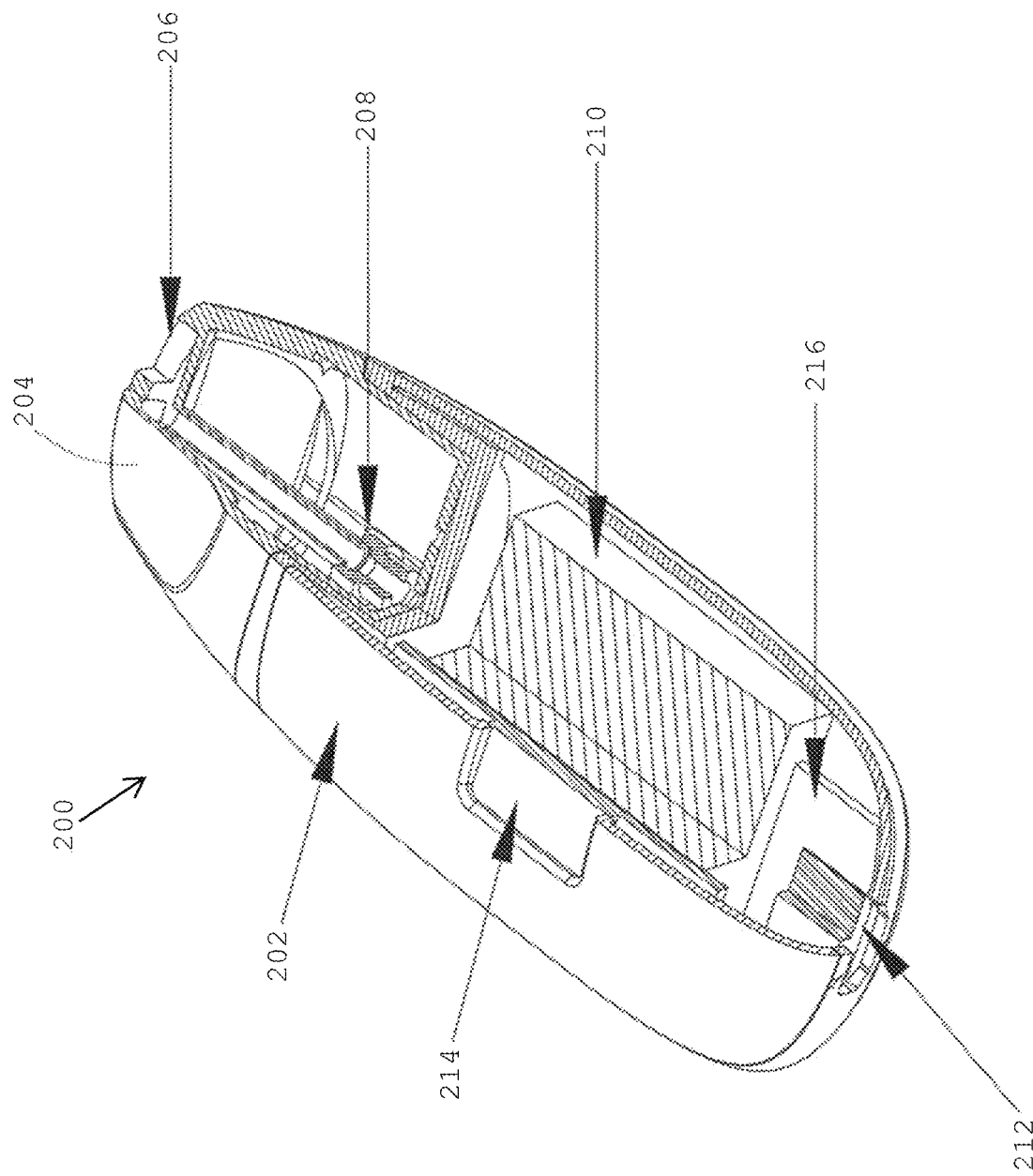
FIG. 2 illustrates a cut-away, partial cross-section of a biometric handheld vaporizer.
Figure 3:
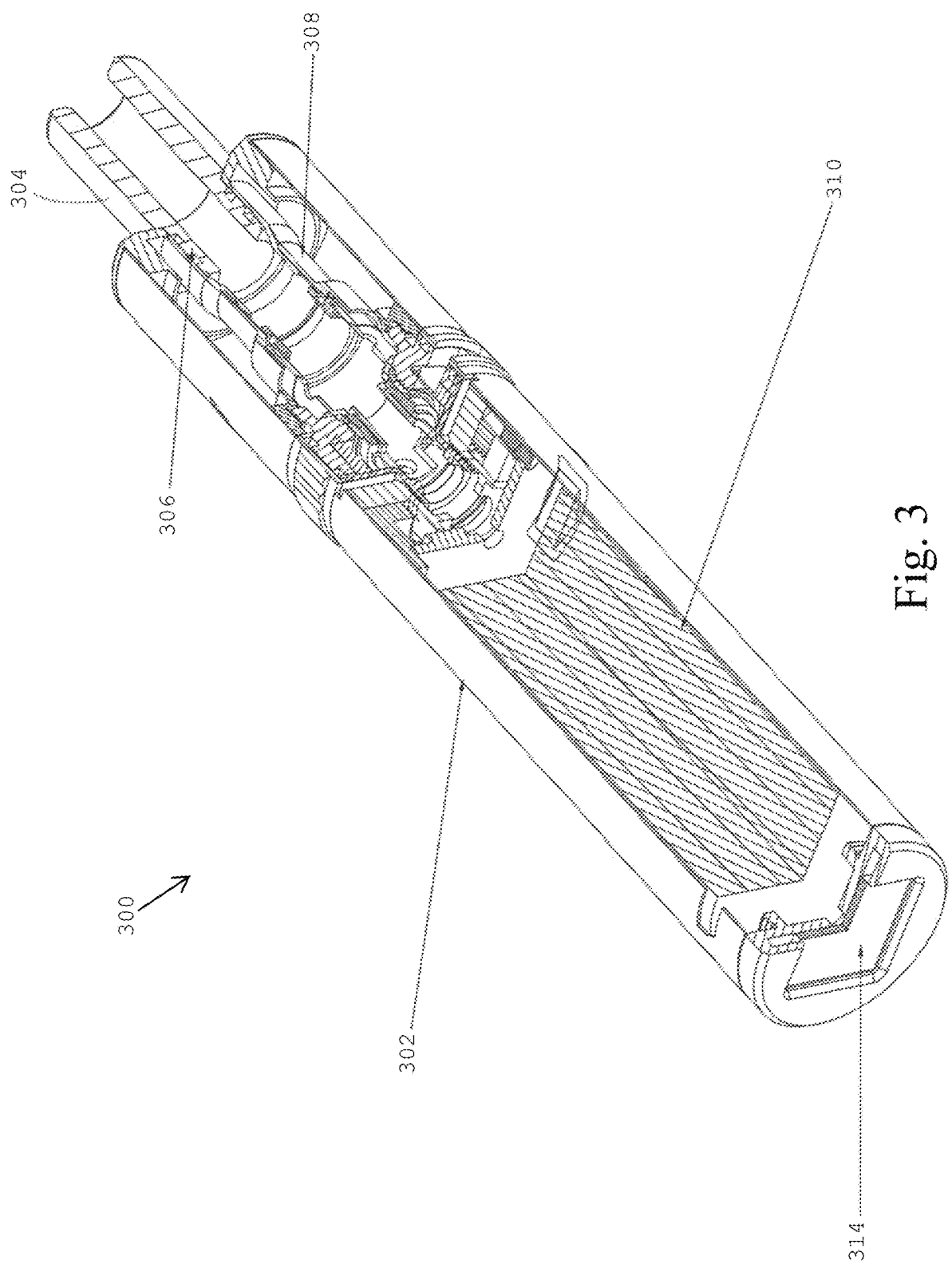
FIG. 3 illustrates a cut-away, partial cross-section of a biometric handheld vaporizer.
Figure 4:
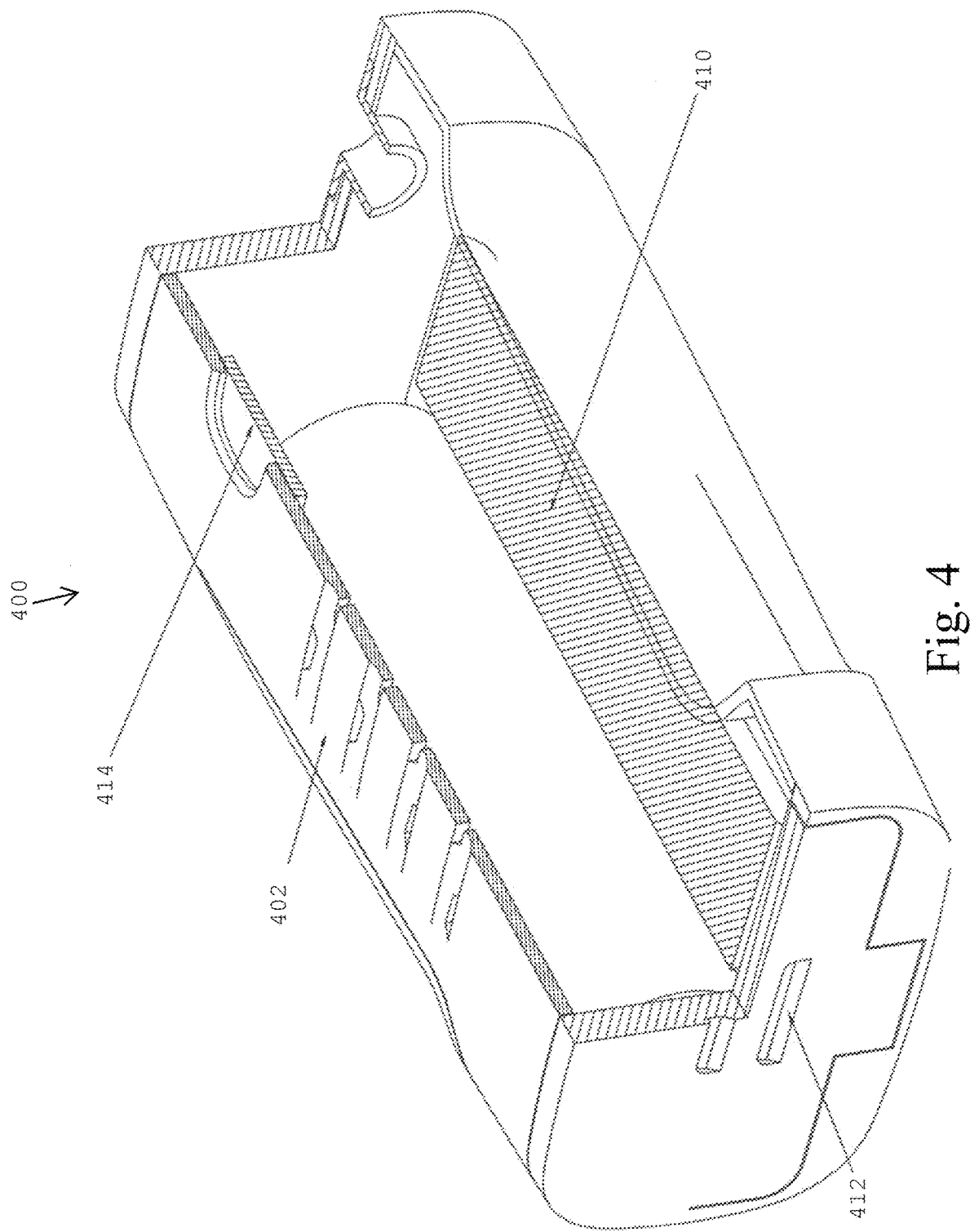
FIG. 4 illustrates a cut-away, partial cross-section of a biometric handheld vaporizer.

In one embodiment, as shown in FIG. 1, a handheld vaporizer 100 comprises a housing 102, a mouthpiece 104, an oil reservoir 106, an atomizer 108 (e.g., heating element/coils, wick, etc.), a battery 110, a battery charging port 112, a fingerprint sensor 114, and a microcontroller or other processor for processing biometric input for unlocking the handheld vaporizer 100. As shown in FIG. 2 a handheld vaporizer 200 comprises a different formfactor from that of FIG. 1. The handheld vaporizer 200 comprises a housing 202, a mouthpiece 204, an oil reservoir 206, an atomizer 208 (e.g., heating element/coils, wick, etc.), a battery 210, a battery charging port 212, and a fingerprint sensor 214, and a controller 216. FIG. 3 shows another formfactor for a handheld vaporizer 300, comprising a housing 302, a mouthpiece 304, an oil reservoir 306, an atomizer 308 (e.g., heating element/coils, wick, etc.), a battery 310, and a fingerprint sensor 314. FIG. 4 shows another formfactor of a handheld vaporizer 400, comprising a housing 402, a battery 410, a charging port 412, and a fingerprint sensor 414.

Figure 5:
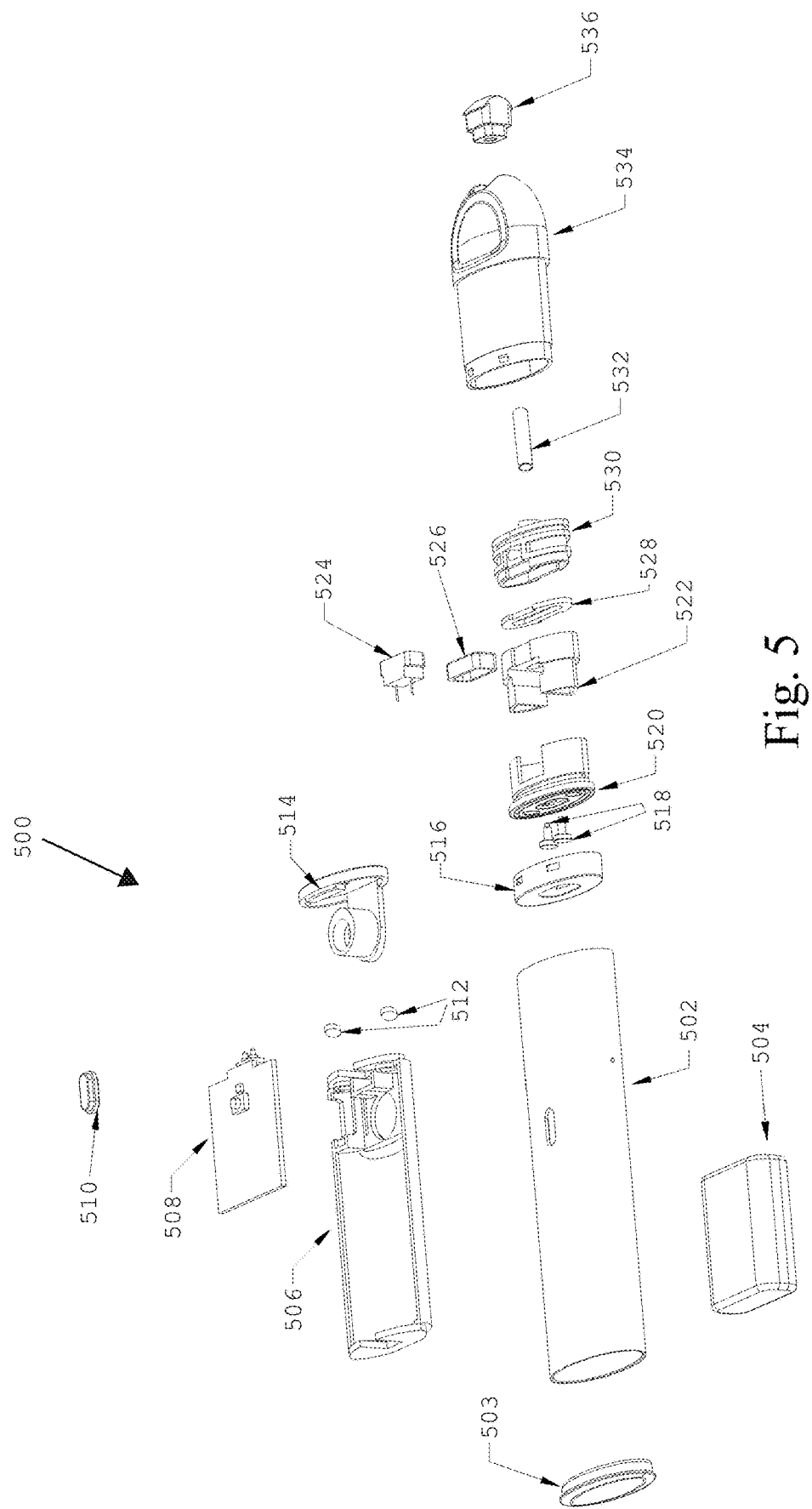
FIG. 5 illustrates an exploded view of a handheld vaporizer.

FIG. 5 shows an exploded view of a handheld vaporizer 500, comprising battery housing 502 and tail cap 503, which contains a battery 504, which is secured in a battery frame 506. A wireless transceiver 508 (e.g., Bluetooth® chip) is further received within the battery housing 502, which may further comprise a button 510, magnets 512, and a silicon positioner 514. The handheld vaporizer 500 further comprises an oil box assembly, which comprises a bottom cap 516, a plurality of pins 518, a stand 520, and a holder 522 for securing the coil 524 and coil seal 526, an upper seal 528, holder 530, and air conduit 532, which may be receivable within the oil housing 534, which has a mouthpiece 536 thereon. It will be noted that the handheld vaporizer 500 does not have a fingerprint sensor. Instead, the handheld vaporizer 500 relies on a connection (using wireless transceiver 508) to another device having such security protocols.

Figure 11:
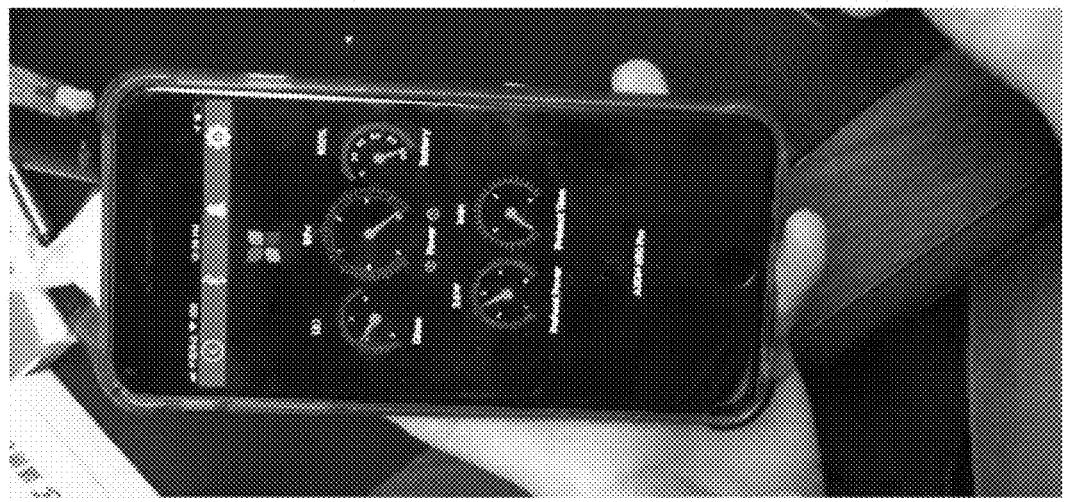
FIG. 11 is a photo of a customization screen of an application to control a handheld vaporizer in use on a smartphone.
Figure 10:
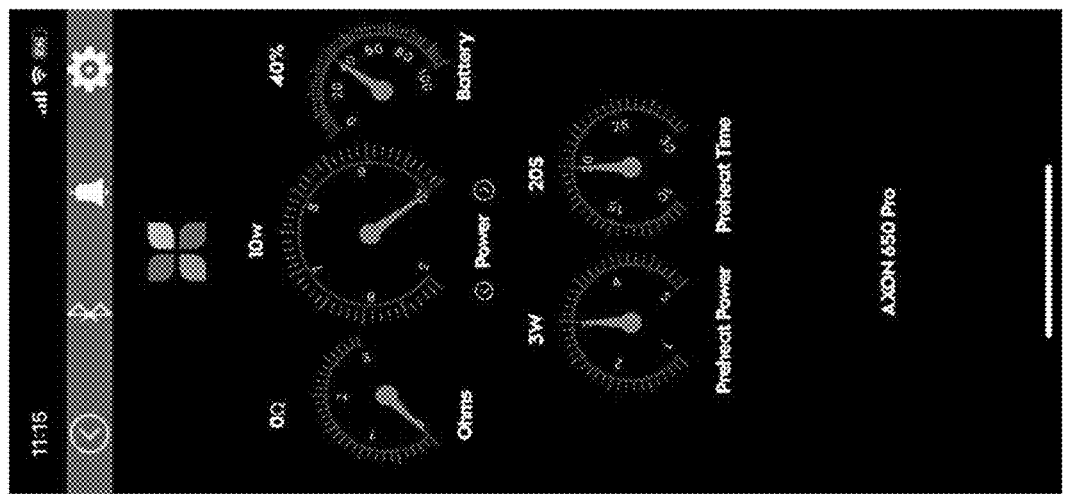
FIG. 10 illustrates a customization screen of an application to control a handheld vaporizer.

In order to initially use a handheld vaporizer 100-500, a user would first need to unlock the handheld vaporizer 100-500 from the manufacturer. The handheld vaporizer 100 will be used as an example, although the following may apply to any of the handheld vaporizer 100-500 described herein. In an effort to reduce or eliminate illegal use of the handheld vaporizer 100 by minors, the handheld vaporizer 100 remains inoperable after purchase by a consumer. Before the handheld vaporizer 100 can be used, the purchaser must submit a government ID (or other suitable form of ID) for age verification. For example, a purchaser would install an application on an internet-connected device (e.g., smartphone, tablet, computer, etc.) that allows the purchaser to both unlock and customize the handheld vaporizer 100. Once installed, the user may then couple (either wired connection or wireless connection (e.g., Bluetooth®)) the handheld vaporizer 100 to the internet-connected device. During setup, the user is presented with a screen to verify their age. The user can then submit photos of an acceptable form of ID to verify their age. Once verified (which may be accomplished in several ways, such as by inspection of the ID by a person or by a computer analyzing the submitted ID), the handheld vaporizer 100 may be unlocked by the manufacturer issuing a unique identifier (e.g., pin code). With the handheld vaporizer 100 unlocked, the user may then freely use the handheld vaporizer 100. The application may also have additional functionality for customizing the handheld vaporizer 100, such as resistance and power level (e.g., 5 watts or 10 watts), as well as preheat options (FIGS. 10-11).

Figure 7:
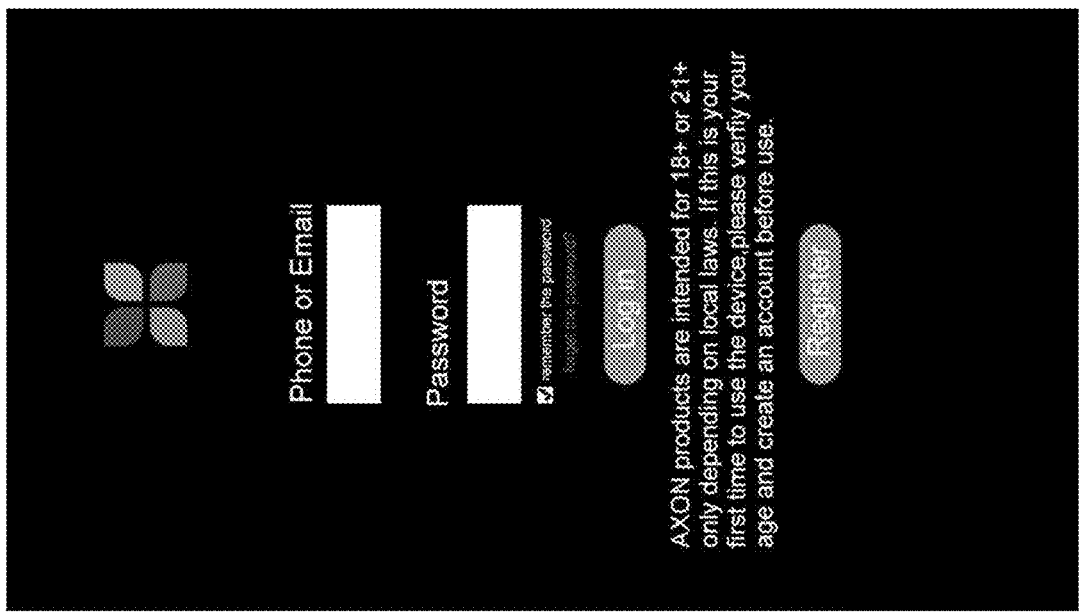
FIG. 7 illustrates a login/registration screen for an application to control a handheld vaporizer.
Figure 6:
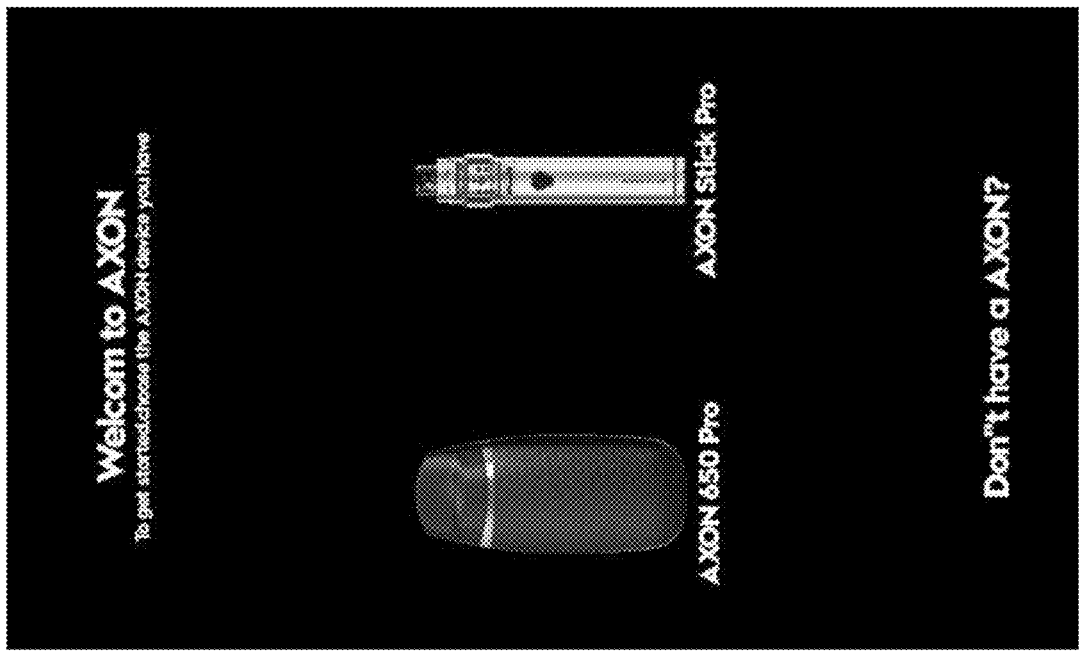
FIG. 6 illustrates a welcome screen for an application to control a handheld vaporizer.
Figure 9:
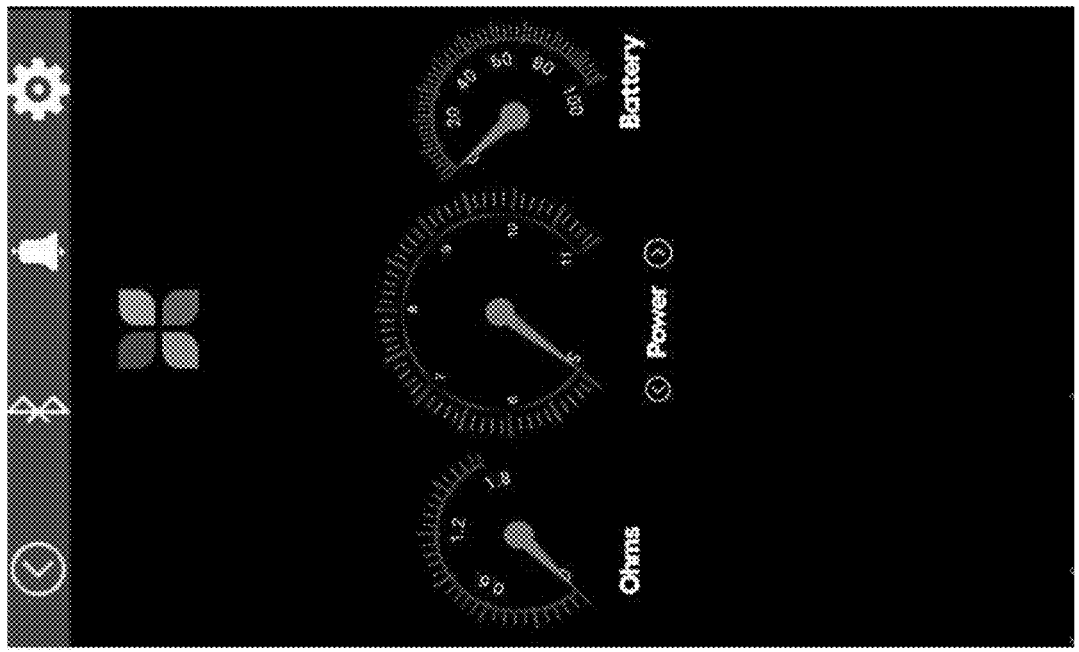
FIG. 9 illustrates a customization screen for an application to control a handheld vaporizer.
Figure 8:
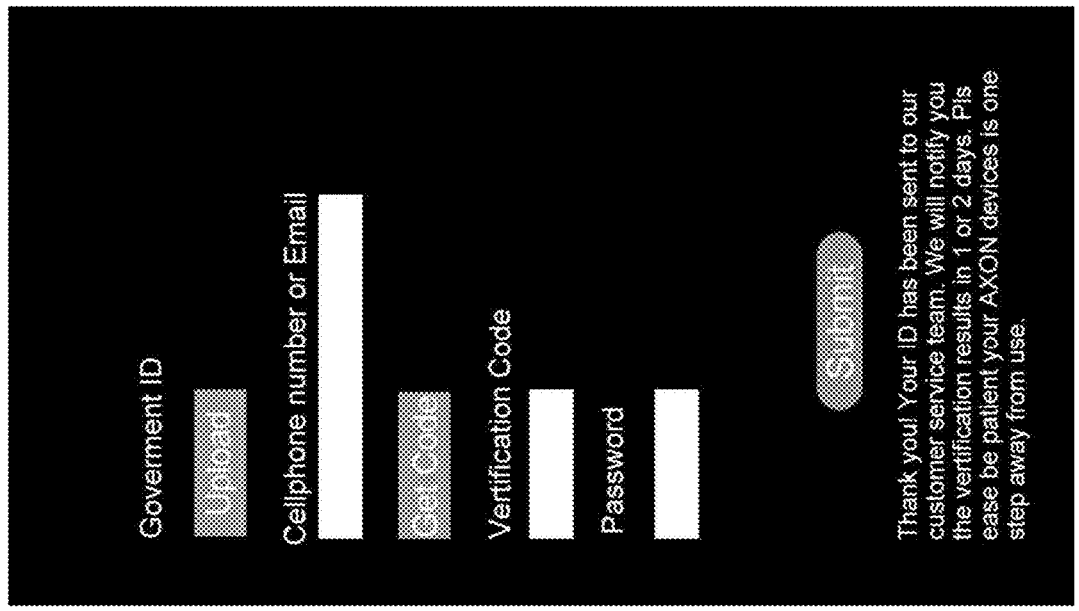
FIG. 8 illustrates a registration screen for an application to control a handheld vaporizer.
Figure 12:
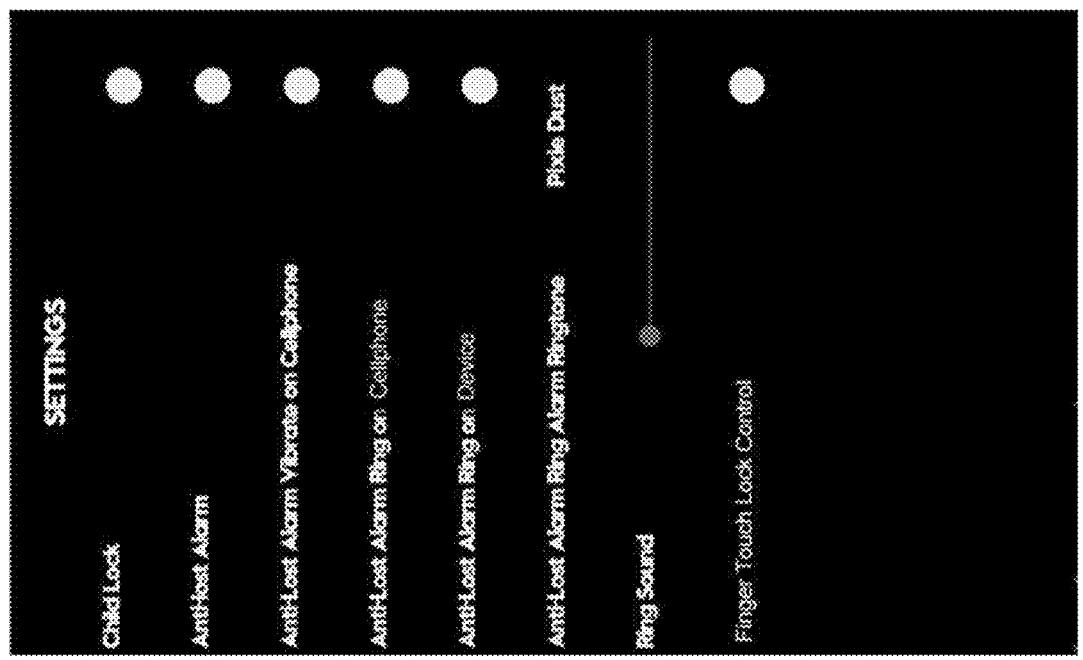
FIG. 12 illustrates a settings screen for an application to control a handheld vaporizer.

Another method of controlling use does not require that the handheld vaporizer 100 be unlocked, but rather that it must communicate with an application on the internet-connected device. In other words, a user would install the relevant application for the handheld vaporizer 100. The user must then register an account with the manufacturer. To do so, the user must submit a form of government ID (or other suitable ID) to verify the age of the individual. Once verified, the user is then registered and the application is functional. With the application functional, the handheld vaporizer 100 can be used. FIGS. 6-12 illustrate non-limiting examples of such an application. FIG. 6 shows a welcome screen where a user may select a model/style of a handheld vaporizer. FIG. 7 shows a login screen and option to register if a new user. FIG. 8 shows the registration screen where a user uploads their Government ID and phone number or email and is provided with a verification code to register and unlock the application. FIG. 9 illustrates controls and customizations for the handheld vaporizer 100 once registered. A user may control resistance (Ohms), power (e.g., 5-10 watts), and see the current battery status. As shown in FIGS. 10-11, additional customizations may include Preheat Power (e.g., 1-5 watts) as well as the Preheat time (e.g., 10-30 seconds). The dials may be adjusted using a finger on the touchscreen, allowing for customization by a user. The ability to quickly and easily alter the power, to preheat, and to control additional settings is an improvement over the prior art, which lacks the combination of such features. FIG. 12 illustrates additional settings and features, such as the ability to turn on or off the child lock (i.e., authorized vs. unauthorized), and set anti-lost features (e.g., Bluetooth® distance settings). In one embodiment, the handheld vaporizer 100 will only function when coupled (e.g., Bluetooth® paired) to the device with the application. Again, this prevents unauthorized users from using the handheld device 100.

In one embodiment, a user must not only unlock the handheld vaporizer 100 from the manufacturer before use, but must also input security credentials so as to prohibit use by unauthorized individuals. For example, after the handheld vaporizer 100 is unlocked (either through user registration in the application or via a unique code for the specific vaporizer 100), the user must then secure the vaporizer 100 using biometrics. This may be accomplished using the fingerprint sensor 114. For example, the application would present a user with a screen for inputting one or more fingerprints. The user would then repeatedly touch the fingerprint sensor 114 so as to record their fingerprints in the handheld vaporizer 100. Once recorded, a user may easily use the handheld vaporizer 100 by placing the authorized finger on the fingerprint sensor 114, which allows the handheld vaporizer 100 to be used. However, it will be appreciated that an application is not required, and that the handheld vaporizer 100 may be self-contained, meaning that it need not communicate with any other device in order to input fingerprints. For example, one or more LEDs or an audible tone may be used to indicate to a user the success or failure of initialization (i.e., input and recording of fingerprints). A physical key, button, or other mechanism may also be used to add additional fingerprints, if desired by a user. With the fingerprints stored in memory, the microcontroller may authorize and/or activate the vaporizer 100 without any other device or input. Once authorized, the vaporizer 100 may have a predetermined access time (e.g., 20 seconds) within which a user may use the device without re-authentication. The benefits of such a device are readily appreciable. For example, only those authorized to use the vaporizer 100 can use it. In other words, not only does this prevent accidental use by children, it also prevents unwanted use by others (e.g., roommates) and reduces the odds of theft-if the device is useless for a thief, such devices will be stolen less often. As apparent from viewing FIGS. 1-5, the vaporizer 100 may be embodied in several formfactors, allowing a user to select the formfactor that they like best.

In one embodiment, a biometric handheld vaporizer comprises a housing, a mouthpiece, an oil reservoir, a heating element, a battery, a battery charging port, a fingerprint sensor, a microcontroller, and a wireless transceiver. In one embodiment, the wireless transceiver utilizes the Bluetooth® communication protocol. In one non-limiting example, a user could pair the vaporizer to their smartphone. Once paired, the user could use an interface on the smartphone to control the vaporizer. For example, initial setup and input of fingerprints may be accomplished using an application on the smartphone. Using the smartphone application, a user could initiate setup mode, which would then allow a user to enter fingerprints into the vaporizer using the fingerprint sensor on the vaporizer. The fingerprint data is also stored locally on the vaporizer, such that the phone need not be connected for a user to authorize and use the vaporizer.

Once the fingerprints have been entered, the user could signal the end of the setup using the smartphone, which sends the appropriate signal to the vaporizer. When a user desires to use the vaporizer, whether or not a Bluetooth® connection is present, a user may activate the fingerprint sensor by placing their finger thereon, which, upon authorizing, activates the atomizer.

In one embodiment, a user may control the handheld vaporizer using a smartphone. For example, rather than have a fingerprint sensor on the vaporizer, the vaporizer can be wirelessly connected to a user's smartphone. The user may then use the smartphone to activate the atomizer within the vaporizer. This may be accomplished using the smartphone's biometric sensors, pin codes, widgets, or any other function. For example, the user may rely on the phone's security protocol, which would require the phone to be authorized before use of the vaporizer. In another method, a user may choose to activate the atomizer whenever it is connected via Bluetooth® to the user's phone. It will be appreciated that any number of configurations are possible.

Therefore, the biometric handheld vaporizer disclosed herein solves the need for a handheld vaporizer that doesn't require additional steps by a user to employ security after initial setup, that prevents any underage or accidental use, and that still remains easy-to-use for the intended user.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention as defined in the appended claims. Additionally, it is not intended that the scope of patent protection afforded the present invention be defined by reading into any claim a limitation found herein that does not explicitly appear in the claim itself.

What is claimed is:

1. A method of preventing use of a handheld vaporizer by minors and securing the handheld vaporizer for use by only authorized individuals, the method comprising:

the handheld vaporizer remaining inoperable until authorization by a manufacturer, wherein authorization comprises the steps of:
i. installing an application on a smartphone;
ii. coupling the handheld vaporizer to the smartphone via a wireless connection;
iii. submitting a photo of a government ID for age verification through the smartphone application;
iv. upon verifying the age of the user, the manufacturer providing a unique code to the purchaser through the smartphone application to register and unlock the application for use with the handheld vaporizer;
whereupon the purchaser may then secure the handheld vaporizer to prevent unauthorized use by registering fingerprints using a fingerprint sensor on the handheld vaporizer;
the smartphone application further allowing a user to control resistance and power, preheat the handheld vaporizer, and view battery status of the handheld vaporizer; and the handheld vaporizer further comprising: a housing, a mouthpiece, an oil reservoir, an atomizer, a battery, a charging port, and a microcontroller.

2. A handheld vaporizer that prevents use by minors and unauthorized individuals, the handheld vaporizer comprising:
- a battery secured to a battery frame, the battery frame receivable within a battery housing, the battery frame secured within the housing using a tail cap coupleable to the battery housing, the battery housing further comprising a wireless transceiver and on/off button;
- an oil box assembly receivable within an oil housing, the oil box assembly comprising:
  - a bottom cap coupled to a stand via a plurality of pins,
  - a coil and a coil seal interposed between the stand and a first holder,
  - an upper seal interposed between the first holder and a second holder, and
  - an air conduit coupled to the second holder and a mouthpiece, wherein the mouthpiece is coupled to the oil housing, the bottom cap securing the oil box assembly within the oil housing, the oil housing coupleable to the battery housing; and a battery charging port;
- wherein the handheld vaporizer remains inoperable until a user registers with a manufacturer by wirelessly pairing the handheld vaporizer to a smartphone, submitting a photo ID to the manufacturer for age verification through a smartphone application, and, upon age verification, the manufacturer sending a code to the smartphone to activate the smartphone application whereupon a user may secure the handheld vaporizer by inputting one or more biometrics into the smartphone, the handheld vaporizer remaining inoperable until the smartphone receives the one or more biometrics.

* * * * *